United States Patent
Lee et al.

(10) Patent No.: US 6,650,240 B2
(45) Date of Patent: Nov. 18, 2003

(54) APPARATUS AND METHOD FOR TRACKING ARTICLES DURING TRAVEL

(75) Inventors: Chung Man Lee, New Territories (HK); Sin Kei Kenneth Fung, Sheung Wan (HK)

(73) Assignee: Techtalion Limited (HK)

( * ) Notice: Subject to any disclaimer, the term of this patent is extended or adjusted under 35 U.S.C. 154(b) by 0 days.

(21) Appl. No.: 10/050,116

(22) Filed: Jan. 18, 2002

(65) Prior Publication Data

US 2003/0137418 A1 Jul. 24, 2003

(51) Int. Cl.$^7$ .............................................. G08B 13/14
(52) U.S. Cl. ................................ 340/572.1; 340/568.1; 340/5.8; 340/5.92; 235/385
(58) Field of Search .......................... 340/572.1, 5.92, 340/5.8, 571, 572.2, 568.7, 10.1, 0.32, 568.1, 0.2, 0.6, 0.7, 505

(56) References Cited

U.S. PATENT DOCUMENTS

| | | | | |
|---|---|---|---|---|
| 4,827,395 A | * | 5/1989 | Anders et al. | 340/10.1 |
| 5,796,351 A | * | 8/1998 | Yabuki | 340/3.51 |
| 5,920,261 A | * | 7/1999 | Hughes et al. | 235/383 |
| 6,195,005 B1 | * | 2/2001 | Maloney | 340/568.1 |
| 6,294,995 B1 | * | 9/2001 | Patterson | 340/568.1 |
| 6,317,044 B1 | * | 11/2001 | Maloney | 340/568.1 |
| 6,366,206 B1 | * | 4/2002 | Ishikawa et al. | 175/26 |

* cited by examiner

Primary Examiner—Benjamin C. Lee
(74) Attorney, Agent, or Firm—Burns, Doane, Swecker & Mathis, L.L.P.

(57) ABSTRACT

The present invention provides an apparatus and method for keeping track of a number of articles, especially for example articles that are being carried while travelling on business and/or vacation. Details of articles to be kept track of are registered with a processing means and each article is provided with an identification means. When it is desired to check for the presence of the articles, for example upon closing a briefcase, the processing means polls the various registered articles to check for their presence and issues an alarm if an article is missing.

10 Claims, 4 Drawing Sheets

APPARATUS AND METHOD FOR TRACKING ARTICLES DURING TRAVEL

FIELD OF THE INVENTION

The present invention relates to a method and apparatus for keeping track of articles, and in particular to such an apparatus and method that may be used to ensure the safe-keeping of a plurality of portable items when travelling.

BACKGROUND OF THE INVENTION

In recent years a large number of types of portable devices have been developed to meet consumer demands. These are devices that are designed and intended to be carried, including when travelling on holiday and on business trips. Such devices include, for example, laptop computers, mobile telephones, cameras, personal digital assistants, electronic diaries, address books and so forth.

Often such devices are carried by their users when travelling on holidays and on business. There is always a risk, however, that such devices may be lost on such trips. This is particularly true when a user is changing hotel rooms frequently, especially on business trips, requiring bags to be unpacked and packed again on a daily or near daily basis. On a long trip, especially if the user of such devices is fatigued or suffering from jetlag, it is easy to overlook such an item when repacking bags before checking out of a hotel. Furthermore such devices are not only expensive to replace, but contain valuable and potentially irreplaceable data. It is an object of the present invention therefore, to provide an apparatus and method for reducing the likelihood that such articles may be lost while travelling.

SUMMARY OF THE INVENTION

According to the present invention therefore there is provided apparatus for keeping track of articles during travel, comprising: identification means for attaching to articles to be tracked, processing means for registering articles to be tracked, and means for checking whether a registered article is present.

Preferably each identification means comprises a passive responding means and the checking means comprises means for polling the identification means. In particular the polling means may comprise a transceiver.

In a preferred embodiment the apparatus is adapted to operate in two modes, a first mode being an article registration mode, and a second mode being an article checking mode. Preferably, when the apparatus is in the first mode, details of articles to be tracked are entered into the processing means by placing the articles within the range of the transceiver and the transceiver reads identification data provided on the identification means. Alternatively, or in addition, means may be further provided for manual entry of data during the registration mode. Preferably the manual data entry means enables information regarding the nature of the article to be entered, or this could be included in the identification means itself.

In a preferred embodiment the apparatus further comprises alarm means for signaling when a registered article is not present. Preferably the apparatus may comprise means for indicating which particular article is not present.

The processing means and said checking means may preferably be adapted to be located within a case, and the checking means may be caused to check for the presence of the registered articles upon closure of the case.

Viewed from another broad aspect the present invention provides a system for checking for the presence of selected articles upon closure of a case, comprising: processing means for registering said articles, identification means for identifying said articles, and means for checking for the presence of said articles in said case.

BRIEF DESCRIPTION OF THE DRAWINGS

An embodiment of the invention will now be described by way of example and with reference to the accompanying drawings, in which.

DETAILED DESCRIPTION OF PREFERRED EMBODIMENT

Figure 1:
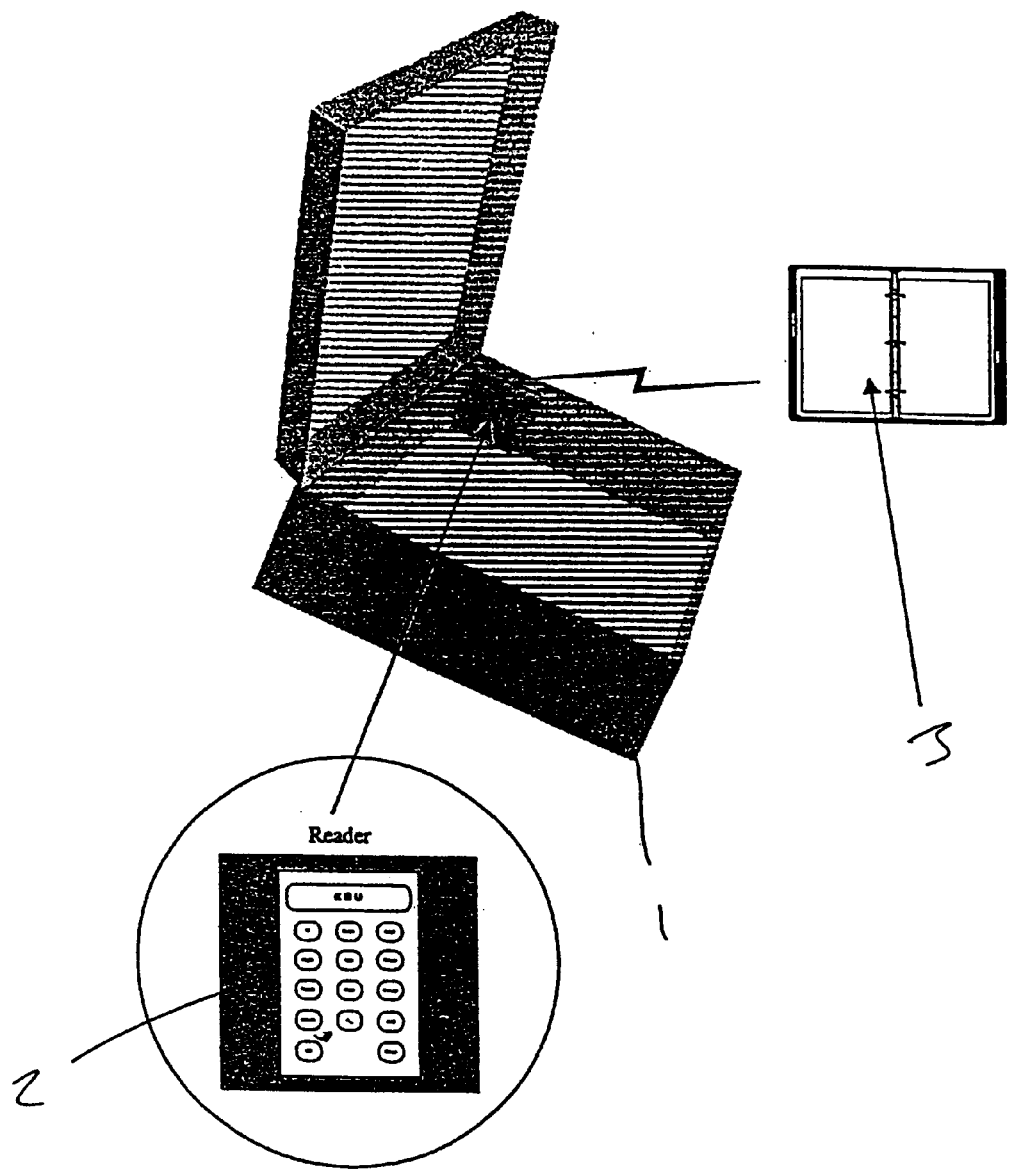
FIG. 1 shows as an example one embodiment of the invention.

Referring firstly to FIG. 1, there is shown by way of example an embodiment of the invention as applied to a briefcase 1. Located within the brief case is an article registration and checking means 2 which may be located on the inside of the briefcase, located on one of the side walls. The precise location is not critical, however, and the article registration and checking means 2 may be located at any point within (or even outside of) the briefcase, but is preferably located so as not to interfere with normal use of the case. A display means, for example an LCD display, is provided associated with the article registration and checking means, and is preferably located so that the display can be viewed when the briefcase is closed.

Figure 2:
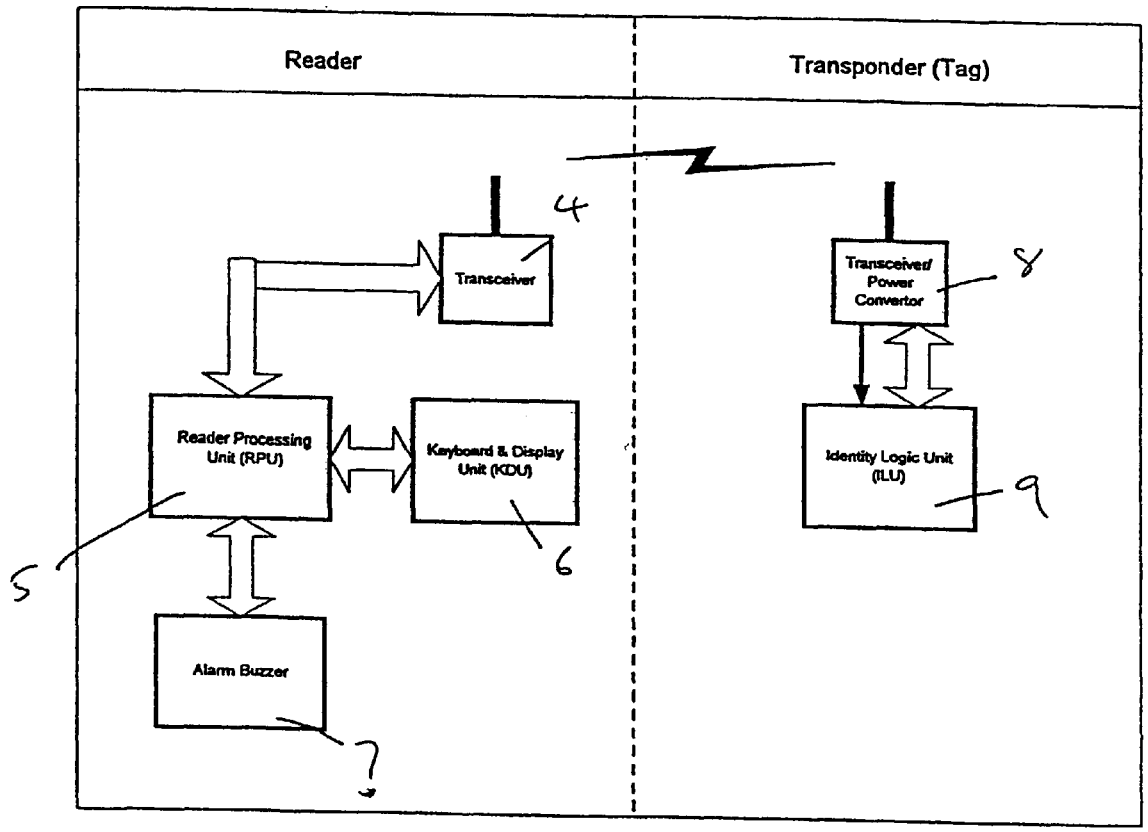
FIG. 2 is a schematic drawing illustrating the functions of the reader and the transponder.

The article registration and checking means 2 includes a reader, while articles to be tracked are provided with identification means in the form of passive responding means 3 which may be attached to the articles to be tracked (in FIG. 1 there is shown a traditional diary to which a passive responding means 3—which may be a transponder tag—is physically attached by some suitable means, eg adhesive, or a physical attachment). As will be seen from FIG. 2, the reader includes a transceiver means 4, a reader processor unit (RPU) 5, a keyboard and display unit (KDI) 6, and an alarm means 7. The passive responding means 3 includes simply a transceiver/power converter 8 and an identity logic unit (ILU) 9. The reader and the responding means communicate through any suitable radio frequency or other wavelength as may be convenient and as may be permitted under the broadcast regulations. Since the reader only operates over a short range given the objective of the invention, it can operate at low power with minimum risk of interference with any other apparatus or device.

The article registration and checking means 2 is designed to check for the presence or absence of predefined articles within the briefcase. To do this, the article registration and checking means operates in two modes: an article registration mode in which the means 2 registers which articles are to be tracked, and an article checking mode in which the means 2 searches for the articles in the briefcase 1.

Figure 3:
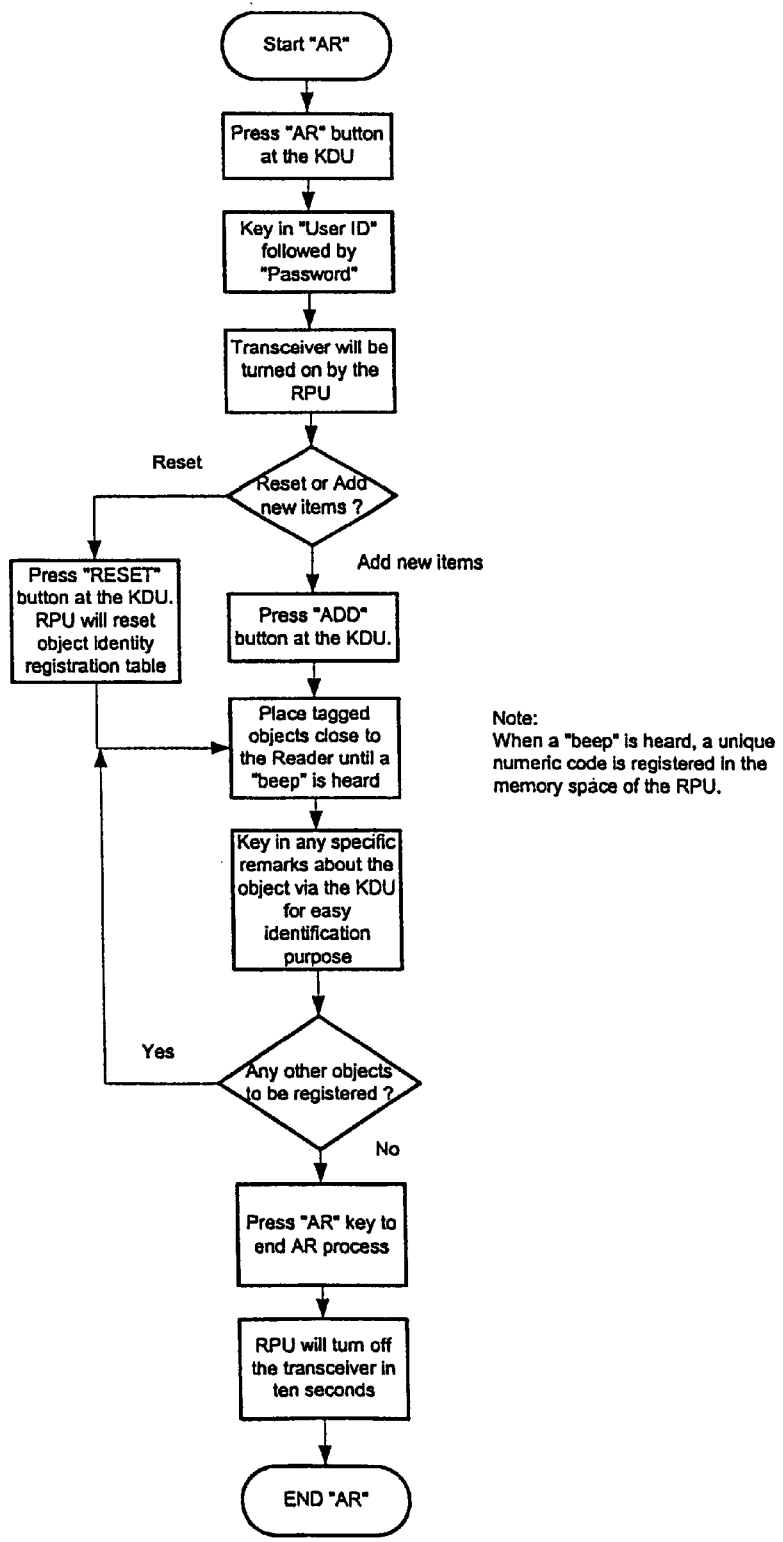
FIG. 3 is a flowchart illustrating the operation of the reader when in an article registration mode.

FIG. 3 is a flowchart illustrating the operation of the article registration and checking means 2 in the article registration mode. In this mode, the article registration and checking means is able to receive information from the passive responding means relating to the articles that it is required to keep track of. Operation in this mode is commenced by pressing an "Article Registration (AR)" key on the keyboard. In order to prevent unauthorised use, a user may then be required to enter a user identification and a password following which the transceiver will be turned on by the reader processing unit. A user will then have the option of either resetting the articles to be tracked, or adding new articles to a list of articles already been tracked. This choice is made by pressing either a RESET or an ADD key on the keyboard. In order to enter an article into the system for tracking, the article provided with a transponder tag is placed close to the reader and the reader reads the identity information regarding the article that is stored in the identity logic unit of the transponder tag, and this information is stored in a memory area of the RPU. A user may also manually key in any desired information regarding that article. This process is repeated for each article to be tracked, and then the article registration mode is complete and the RPU will turn off the transceiver after a short interval, eg ten seconds. At the end of this operation a number of articles will be registered with the system.

Once this operation is complete, the article registration and checking means will have in its memory information identifying a number of articles that are to be tracked. This information may be basic and limited to the fact that a given number of articles are to be tracked, fifteen or twenty articles say, without identifying what those articles are, or it may include descriptive information regarding the nature of those articles. For example, the identity logic unit of each transponder tag may simply contain a unique ID number without identifying the nature of the article to which the tag is attached. For practical purposes this may well be sufficient as the object of the invention can be fulfilled simply by the article registration and checking means knowing only that there is a given number of articles to be tracked. However, the user can key in more information, for example to indicate that a particular tag corresponds to a diary, mobile phone, personal digital assistant or whatever article it is that is to be tracked. As will be seen below this will provide greater assistance to a user if an article is mislaid.

Figure 4:
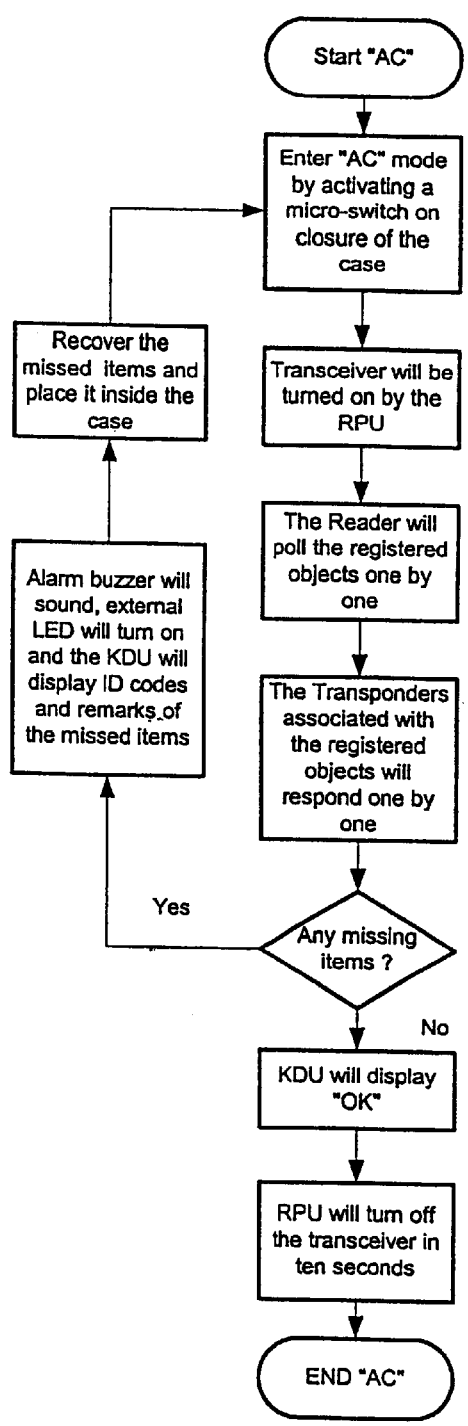
FIG. 4 is a flowchart illustrating the operation of the reader when in an article checking mode.

It will be understood that the reader is provided within a case in which the articles being tracked are to be carried. This may for example be a briefcase or any other form of carrying case. When a user places the articles being tracked into the case, for example when checking out of a hotel room, or when leaving offices following a meeting, the article registration and checking means checks to see if all the articles being tracked have in fact been placed in the case. This is achieved by the article registration and checking means operating in an article checking mode as will now be described with reference to the flowchart of FIG. 4.

The article checking mode is activated when the case is closed, either by a user or more preferably automatically upon operation of a microswitch when the case is closed. The reader processing unit turns on the transceiver and polls the registered articles one by one. The transponders associated with each article will reply one by one if they are located within the case and thus within the range of the reader. The reader has a relatively short range so that only if the articles are in the case will they respond, and no false response will be received from an article that is close to but outside of the case. If any registered article fails to respond an audible and/or flashing alarm is initiated and details of the missing article are displayed on the keyboard and display unit. Another possibility is that an audible alarm may include an electronically created voice message telling a user that an article is missing. This information may be only a simple ID of the missing article, or even just the fact that an article is missing, but if the user has entered more information about the nature of each article that has been registered, then that information can be displayed, for example indicating "Mobile phone missing" or a similar message. If all the registered articles are present within the briefcase no alarm will sound, an OK message will be displayed on the display unit and the reader will switch itself off within ten seconds of completion of the article checking mode.

It should be noted that it would also be possible for the article checking mode to be entered at any time, either automatically or at a predetermined interval. Such a possibility enables the presence of registered articles to be monitored at any time and not merely when the case is being closed. This is advantageous as it provides a security mechanism against theft of articles. For example, if a briefcase or suitcase is checked in as baggage on a flight, then following retrieval of the case its owner may activate the checking mode to confirm the presence of all registered articles.

It will thus be seen that at least in its preferred forms the present invention provides a convenient and simple apparatus for enabling a number of articles to be tracked and their presence confirmed. The present invention is particularly useful for enabling a traveler to ensure that all important articles are packed safely, but the invention could have a number of applications. For example, the invention could be used in a workshop to ensure that at the end of a day or a job all tools are safely returned to a toolbox. Another possibility is that the invention could be applied in a hospital operating theatre to ensure that at the end of surgery all surgical tools are safely accounted for.

What is claimed is:

1. Apparatus for keeping track of articles, comprising:

identification means for attaching to articles to be tracked, processing means for registering articles to be tracked, and means for checking whether a registered article is present, wherein said processing means and said checking means are adapted to be located within a case, and wherein said checking means is caused to check for said registered articles upon closure of said case.

2. Apparatus as claimed in claim 1 wherein each said identification means comprises a passive transponder and said checking means comprises means for polling said identification means.

3. Apparatus as claimed in claim 2 wherein said polling means comprises a transceiver.

4. Apparatus as claimed in claim 3 wherein said apparatus is adapted to operate in two modes, a first mode bing an article registration mode, and a second mode being an article checking mode.

5. Apparatus as claimed in claim 4 wherein when said apparatus is in said first mode, details of articles to be tracked are entered into said processing means by placing said articles within the range of said transceiver and said transceiver reads identification data provided on said identification means.

6. Apparatus as claimed in claim 5 wherein means are further provided for manual entry of data during said registration mode.

7. Apparatus as claimed in claim 6 wherein said manual data entry means enables information regarding the nature of the article to be entered.

8. Apparatus as claimed in claim 1 wherein said identification means includes means for identifying the nature of an article.

9. Apparatus as claimed in claim 1 further comprising alarm means for signaling when a registered article is not present.

10. Apparatus as claimed in claim 9 further comprising means for indicating which particular article is not present.

* * * * *